United States Patent
Yang et al.

(10) Patent No.: US 9,331,622 B2
(45) Date of Patent: May 3, 2016

(54) METHOD AND CONTROL SYSTEM FOR SUPPRESSION OF VIBRATION

(71) Applicant: LITE-ON TECHNOLOGY CORP., Taipei (TW)

(72) Inventors: Sheng-Ming Yang, New Taipei (TW); Shih-Chuan Wang, New Taipei (TW)

(73) Assignee: Lite-On Technology Corp., Taipei (TW)

( * ) Notice: Subject to any disclaimer, the term of this patent is extended or adjusted under 35 U.S.C. 154(b) by 20 days.

(21) Appl. No.: 14/529,428

(22) Filed: Oct. 31, 2014

(65) Prior Publication Data

US 2015/0123584 A1    May 7, 2015

(30) Foreign Application Priority Data

Nov. 1, 2013 (TW) .............................. 102139784 A

(51) Int. Cl.
*G05D 19/02* (2006.01)
*H02P 23/04* (2006.01)

(52) U.S. Cl.
CPC ..................... *H02P 23/04* (2013.01)

(58) Field of Classification Search
CPC ....... G01H 1/003; G01H 3/08; G01M 13/045; H02P 23/04
See application file for complete search history.

(56) References Cited

U.S. PATENT DOCUMENTS

2015/0012160 A1* 1/2015 Tsutsumi ................ B60L 15/20
701/22

\* cited by examiner

*Primary Examiner* — Karen Masih
(74) *Attorney, Agent, or Firm* — Rosenberg, Klein & Lee

(57) ABSTRACT

A method for suppression of vibration includes: adjusting a center frequency of a band-pass filter, and subjecting a to-be-detected signal to processing by the band-pass filter to result in a bandpass-filtered signal; performing signal processing upon the bandpass-filtered signal to obtain a converted result; determining whether a scanning process is completed, and repeating the previous two steps when a result is negative to obtain plural converted results; determining a maximum value among the converted results, and determining the corresponding center frequency to serve as an interference frequency; and setting the interference frequency as an operating frequency of a notch filter.

18 Claims, 14 Drawing Sheets

METHOD AND CONTROL SYSTEM FOR SUPPRESSION OF VIBRATION

CROSS-REFERENCE TO RELATED APPLICATION

This application claims priority of Taiwanese Patent Application No. 102139784, filed on Nov. 1, 2013, the entire disclosure of which is incorporated herein by reference.

BACKGROUND OF THE INVENTION

1. Field of the Invention

The invention relates to a method and a control system for suppression of vibration, more particularly to a method and a control system configured to automatically detect an interference frequency associated with the vibration, and to control a notch filter so as to suppress the vibration.

2. Description of the Related Art

Vibrations that occur in a control system may be sorted into many categories according to different origins of the vibrations, such as vibrations resulting from control or vibrations resulting from mechanism. Torsional vibration and mechanism resonance are two common situations in vibrations resulting from mechanism.

In general, the mechanism resonance of different types and different frequencies usually occurs in a motor control system. This mechanism resonance may result in velocity error and position error during operation of a motor, and may even cause damage to the motor control system when there is an excessive level of the mechanism resonance.

When the mechanism resonance occurs during operation of the motor control system, several conventional measures may be adopted to solve this problem. One of the measures is to reduce the gain and the bandwidth of the motor control system so as to avoid a resonant frequency associated with the mechanism resonance. However, a performance of the motor control system may be adversely influenced. Another way is to include a notch filter in a control circuit of the motor control system so as to suppress the mechanism resonance. Nevertheless, since the notch filter requires manual adjustment when the resonant frequency varies, this way is not time-efficient.

SUMMARY OF THE INVENTION

Therefore, an object of the present invention is to provide a method and a control system configured to automatically detect an interference frequency, and to control a notch filter according to the interference frequency so as to achieve vibration suppression.

According to a first aspect of the present invention, a method is provided for suppression of vibration that occurs in a control system. The method is to be implemented by the control system and comprises the steps of:

(A) receiving a to-be-detected signal obtained within a time period under the influence of vibration;

(B) adjusting a center frequency of a band-pass filter, and subjecting the to-be-detected signal to processing by the band-pass filter to result in a bandpass-filtered signal;

(C) performing signal processing upon the bandpass-filtered signal to obtain a converted result corresponding to a current center frequency of the band-pass filter;

(D) determining whether a scanning process is completed, and when the scanning process is determined to be not completed, repeating steps (B) and (C) to result in plural entries of the converted results;

(E) when the scanning process is determined to be completed in step (D), determining a maximum value among the plural entries of the converted results, and determining the corresponding center frequency to serve as an interference frequency associated with the vibration that occurs in the control system; and (F) setting the interference frequency as an operating frequency of a notch filter of the control system so as to suppress the vibration.

According to a second aspect of the present invention, a control system is configured for suppression of vibration that occurs therein. The control system includes a band-pass filter, a notch filter, and a controller coupled to the band-pass filter and the notch filter. The controller is configured to receive a to-be-detected signal obtained within a time period under the influence of vibration, to adjust a center frequency of the band-pass filter, and to subject the to-be-detected signal to processing by the band-pass filter to result in a bandpass-filtered signal. The controller is further configured to perform signal processing upon the bandpass-filtered signal to obtain a converted result corresponding to a current center frequency of the band-pass filter, and to determine whether a scanning process is completed. When the scanning process is determined to be not completed, the adjusting of the center frequency and performing of the signal processing are repeated to result in plural entries of the converted results. When the scanning process is determined to be completed, the controller is further configured to determine a maximum value among the plural entries of the converted results, to determine the corresponding center frequency to serve as an interference frequency associated with the vibration that occurs in the control system, and to set the interference frequency as an operating frequency of the notch filter so as to suppress the vibration.

An effect of the present invention resides in that, by adjusting a center frequency of a band-pass filter, by subjecting a to-be-detected signal to processing by the band-pass filter to result in a bandpass-filtered signal, by performing signal processing upon the bandpass-filtered signal to obtain a converted result, by repeating the aforementioned steps several times until a scanning process is completed, by obtaining a maximum value among the converted results, and by determining an interference frequency based on the maximum value, an effect of automatic detection may be achieved. Moreover, an operating frequency of the notch filter is adjusted according to the interference frequency so as to achieve an effect of vibration suppression.

BRIEF DESCRIPTION OF THE DRAWINGS

Other features and advantages of the present invention will become apparent in the following detailed description of embodiments with reference to the accompanying drawings, of which.

DETAILED DESCRIPTION OF THE EMBODIMENTS

Figure 1:
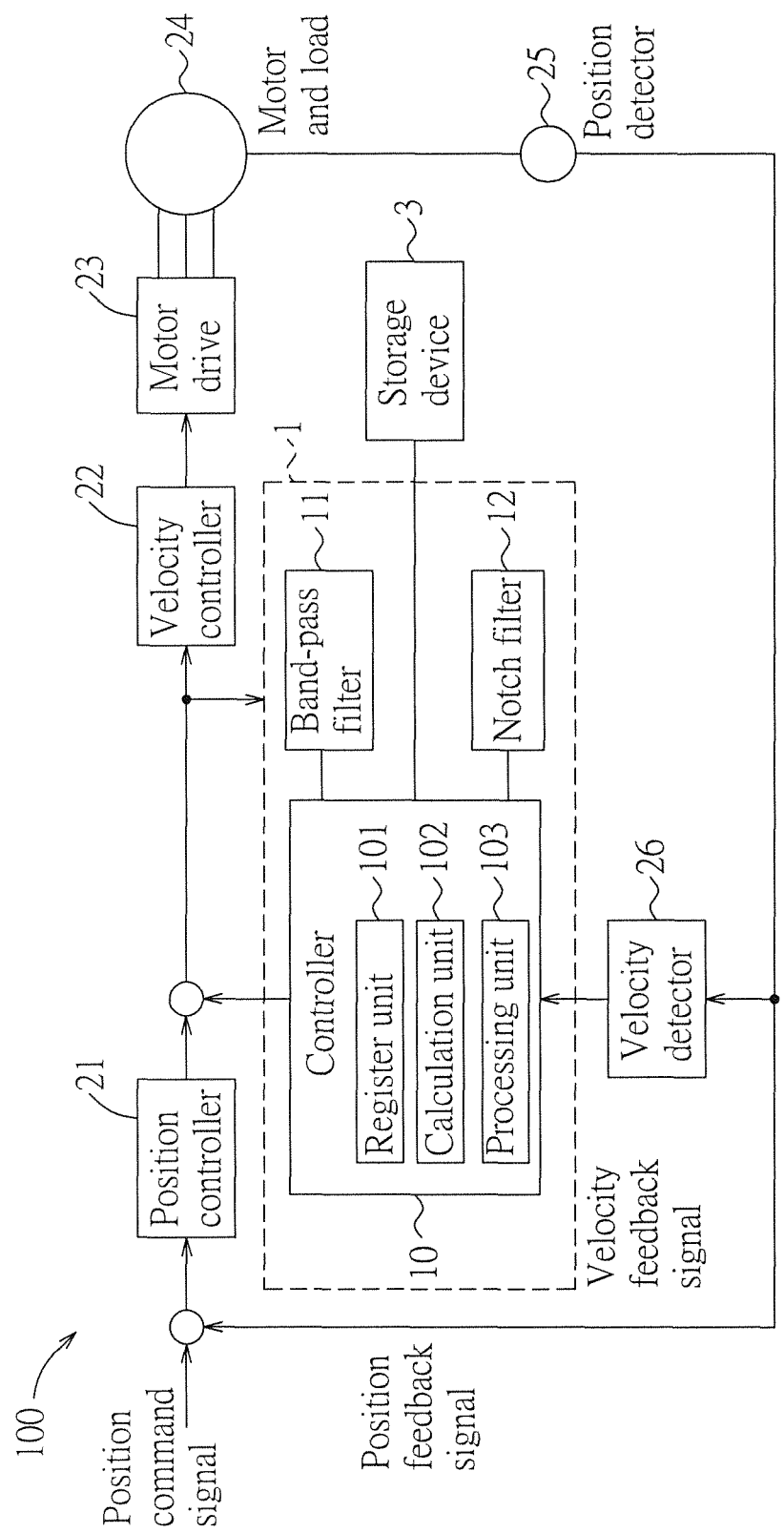
FIG. 1 is a block diagram illustrating an embodiment of a control system for suppression of vibration according to the present invention.

Referring to FIG. 1, an embodiment of a control system 100, according to the present invention, is configured to implement a method for suppression of vibration that occurs in the control system 100. The control system 100 includes a control device 1, a storage device 3, a position controller 21, a velocity controller 22, a motor drive 23, a motor and load 24, a position detector 25 and a velocity detector 26.

An output of the motor and load 24 is detected by the position detector 25, which generates a position feedback signal based on the output, and is detected by the velocity detector 26, which generates a velocity feedback signal based on the output. The position feedback signal is subtracted from a position command signal, which is inputted to the control system 100, to result in a position error signal. The position controller 21 generates a velocity output signal based on the position error signal. The velocity feedback signal generated by the velocity detector 26 is subtracted from the velocity output signal generated by the position controller 21 to result in a velocity error signal. The velocity controller 22, based on the velocity error signal, controls the motor drive 23 to adjust driving of the motor and load 24.

Specifically, the control device 1 includes a controller 10, a band-pass filter 11 and a notch filter 12. The controller 10 includes a register unit 101, a calculation unit 102 and a processing unit 103. The band-pass filter 11 has an adjustable center frequency.

The controller 10 receives the velocity error signal obtained by subtracting the velocity feedback signal from the velocity output signal. The velocity error signal serves as a to-be-detected signal. Nevertheless, the to-be-detected signal is not limited to the velocity error signal as disclosed in this embodiment, and signals output from the elements of the control system 100 may be selected by the skilled person in the relevant art to serve as the to-be-detected signal in variations of the embodiment. For example, the velocity output signal generated by the position controller 21, a signal generated by the velocity controller 22, a signal generated by the motor drive 23, the output of the motor and load 24, or the position feedback signal generated by the position detector 25 may be applicable to the present invention.

Figure 2:
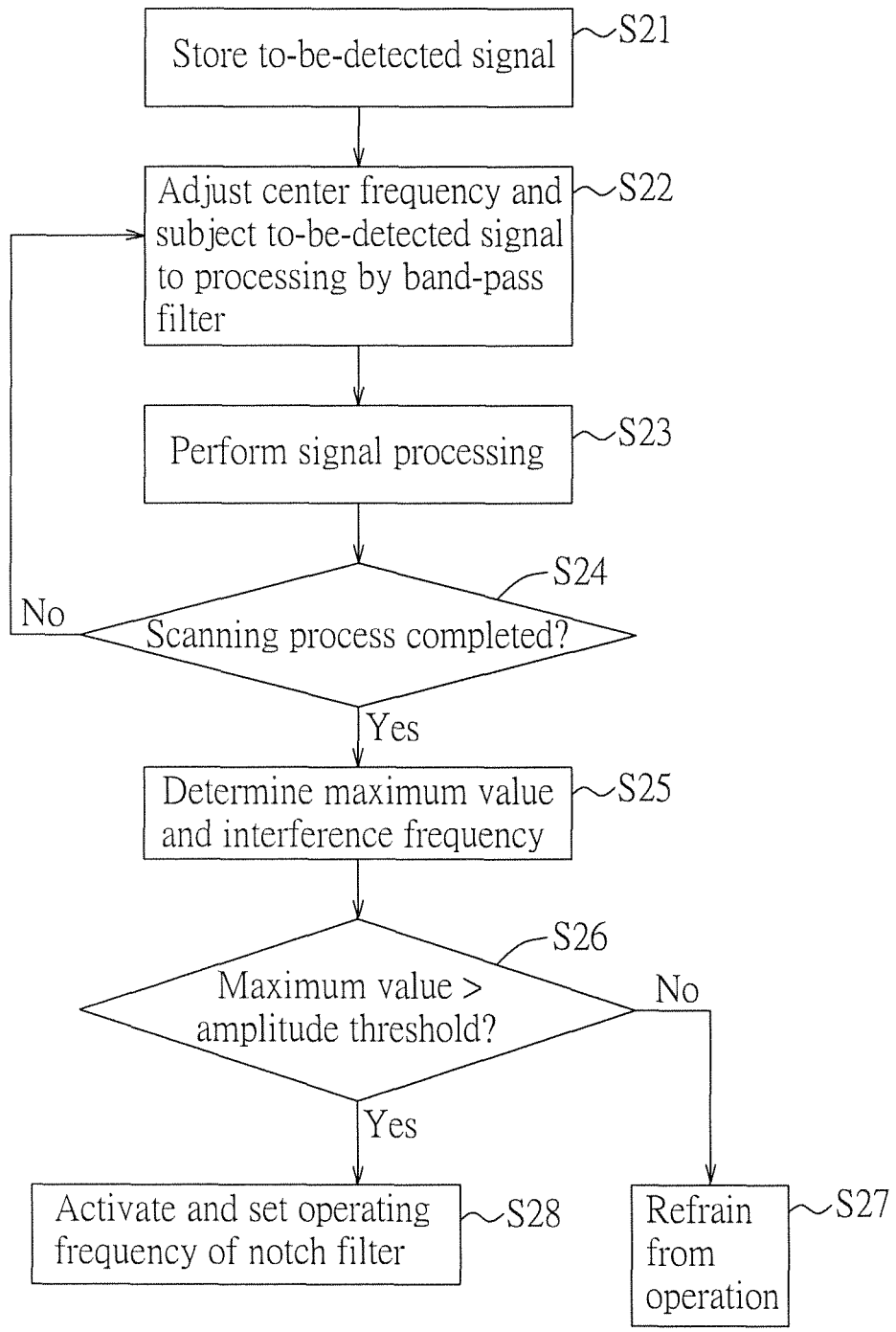
FIG. 2 is a flow chart illustrating a first embodiment of a method for suppression of vibration according to the present invention.

Referring to FIG. 1 and FIG. 2, a first embodiment of the method for suppression of vibration, according to the present invention, includes the following steps.

In step S21, the storage device 3 stores the to-be-detected signal, which is obtained within a time period under the influence of vibration. The to-be-detected signal is obtained by the controller 10, and is temporarily stored in the register unit 101.

In step S22, the processing unit 103 adjusts the center frequency of the band-pass filter 11, and subjects the to-be-detected signal to processing by the band-pass filter 11 having the center frequency thus adjusted to result in a bandpass-filtered signal.

In step S23, the calculating unit 102 performs signal processing upon the bandpass-filtered signal to obtain a converted result corresponding to a current center frequency of the band-pass filter 11, and stores the converted result together with the current center frequency.

In step S24, the controller 10 determines whether a scanning process is completed. The flow goes back step S22 when the controller 10 determines that the scanning process is not yet completed.

Steps S22 and S23 are repeated such that plural entries of the converted results corresponding respectively to different center frequencies of the band-pass filter 11 adjusted in step S22 may be obtained. A frequency spectrum with amplitudes presented by the plural entries of converted results and plotted over the different center frequencies may be obtained. The frequency spectrum may be regarded as a conversion of the to-be-detected signal from the time domain to the frequency domain.

In step S25, the processing unit 103 determines a maximum value among the plural entries of the converted results, and determines a corresponding one of the different center frequencies that corresponds to the maximum value. The corresponding one of the different center frequencies thus determined serves as an interference frequency associated with the vibration that occurs in the control system 100.

In step S26, the processing unit 103 determines whether the maximum value is greater than an amplitude threshold.

In step S27, the processing unit 103 controls the notch filter 12 to refrain from operation when the maximum value is determined to be not greater than the amplitude threshold.

In step S28, the processing unit 103 activates the notch filter 12, and sets the interference frequency determined in step S25 as an operating frequency (i.e., a center frequency) of the notch filter 12 when the maximum value is determined to be greater than the amplitude threshold, so as to suppress the interference resulting from vibration.

Figure 3:
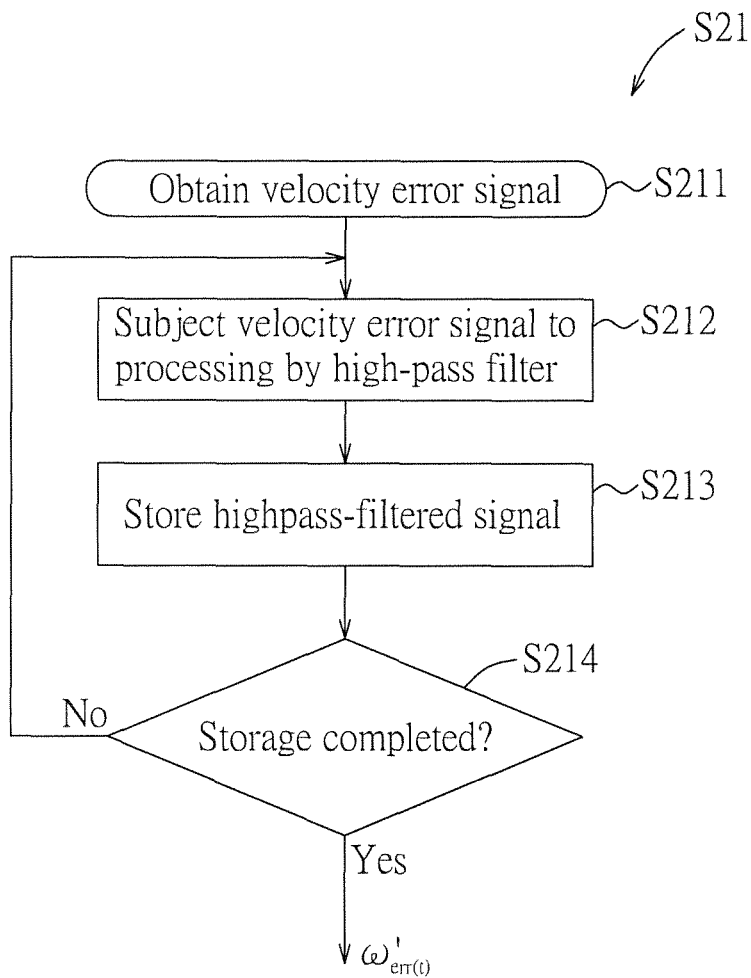
FIG. 3 is a flow chart illustrating pre-processing of a velocity error signal to result in a to-be-detected signal.

Specifically, referring to FIG. 3, step S21 of FIG. 2 includes the following sub-steps associated with pre-processing of the velocity error signal.

In step S211, the velocity error signal is obtained by subtracting the velocity feedback signal from the velocity output signal.

In step S212, the velocity error signal is subjected to processing by a high-pass filter (not shown) to result in a high-pass-filtered signal.

In step S213, the highpass-filtered signal is stored in the storage device 3.

In step S214, a determination as to whether storage of the highpass-filtered signal is completed is made.

In this embodiment, the velocity error signal is subjected to processing by the high-pass filter so as to obtain a baseband component and a resonant frequency of the velocity error signal while filtering out a direct current (DC) component thereof. The highpass-filtered signal may be sampled and stored in the storage device 3. Specifically, the highpass-filtered signal serves as the to-be-detected signal in step S21 of the method according to the present invention.

Figure 4:
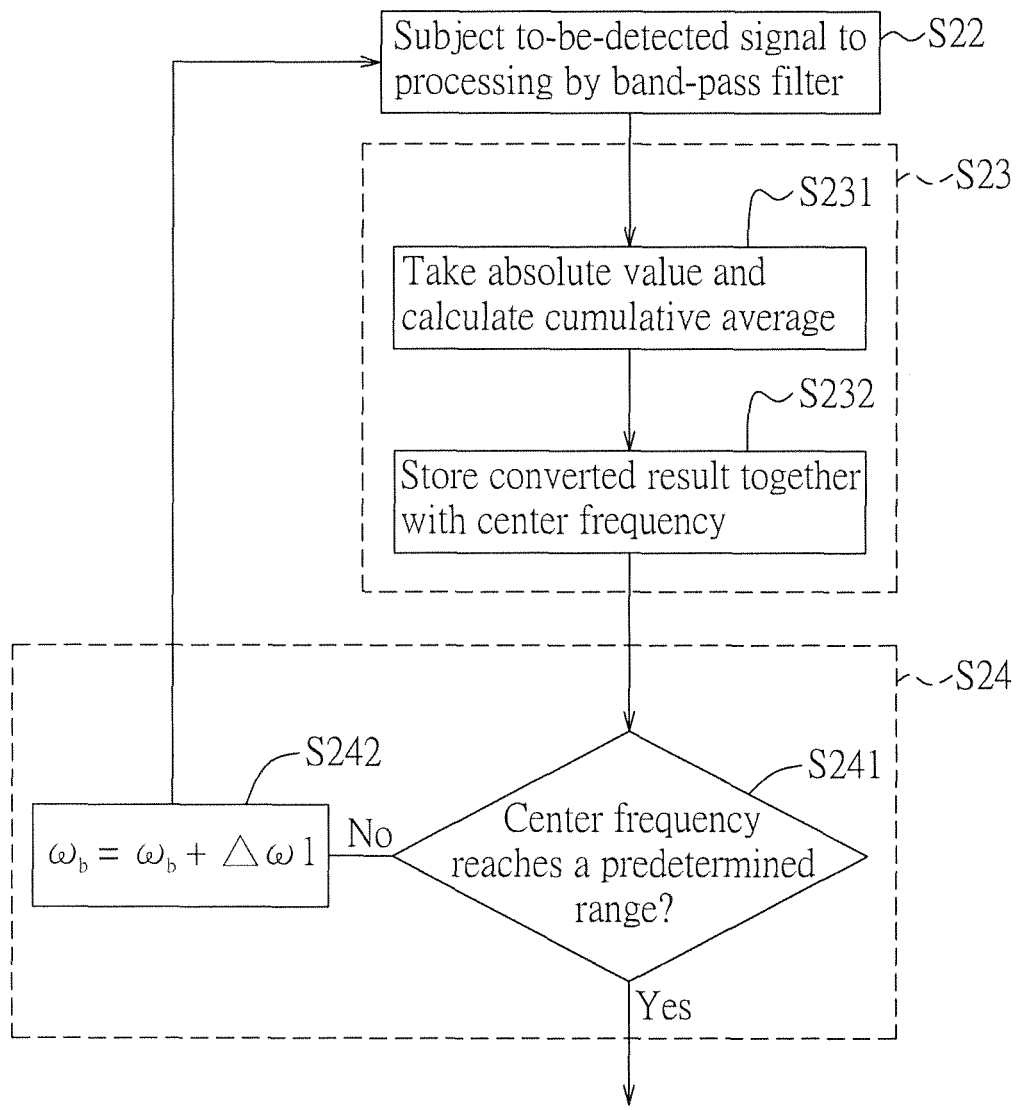
FIG. 4 is a flow chart illustrating detailed steps of band-pass filtering and signal processing.
Figure 5:
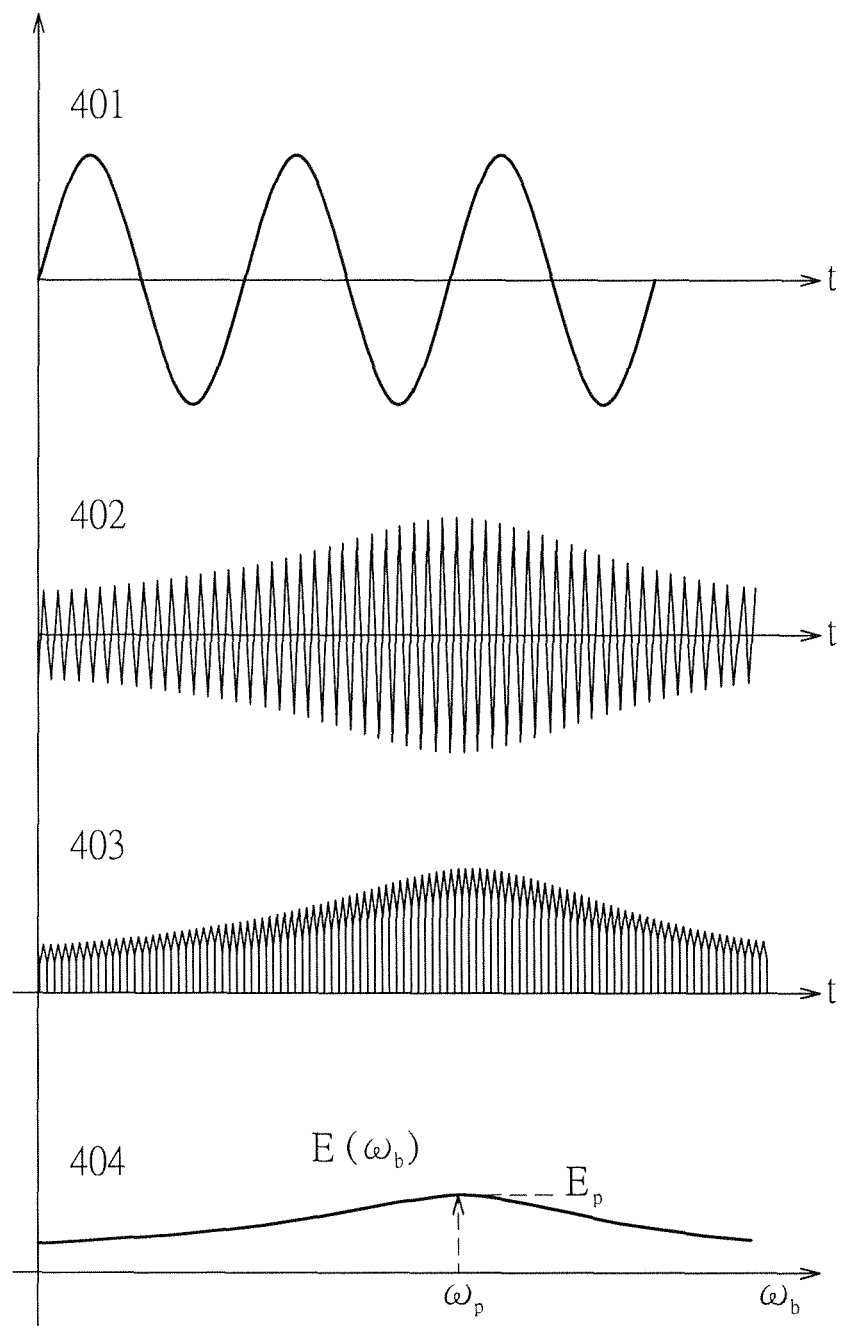
FIG. 5 illustrates changes in a waveform of the to-be-detected signal undergoing the band-pass filtering and signal processing.

Specifically, referring to FIG. 4 and FIG. 5, in step S22, the to-be-detected signal 401 is subjected to processing by the band-pass filter 11 to result in the bandpass-filtered signal 402. The register unit 101 temporarily stores the bandpass-filtered signal 402. The signal processing of step S23 of FIG. 2 includes the following sub-steps S231 and S232. Step S24 associated with the determination as to whether the scanning process is completed includes the following sub-steps S241 and S242.

In step S231, the calculation unit 102 takes the absolute value 403 of the bandpass-filtered signal 402, and calculates the cumulative average of the absolute value 403 of the bandpass-filtered signal 402 to obtain the converted result which corresponds to the current center frequency of the band-pass filter 11.

In step S232, the calculation unit 102 stores the converted result together with the current center frequency.

In step S241, the processing unit 103 determines whether the scanning process is completed by determining whether the current center frequency reaches a predetermined range, e.g., greater than a predetermined value (e.g., 600 Hz). The scanning process is completed and the flow proceeds to step S25 when a result of the determination made in this step is affirmative.

Otherwise, in step S242, the processing unit 103 updates the center frequency ($\omega_b$) of the band-pass filter 11 by increasing the current center frequency by an increment ($\Delta\omega1$), such that the processing unit 103 adjusts the center frequency ($\omega_b$) of the band-pass filter 11 according to the updated center frequency ($\omega_b = \omega_b + \Delta\omega1$) in step S22. It is noted that the center frequency ($\omega_b$) of the band-pass filter 11 is set with an initial center frequency (e.g., 100 Hz) in an initial stage of the scanning process.

It is noted that the plural entries of the converted results are stored in step S232. Referring to FIG. 5, the frequency spectrum 404 with amplitudes presented by the plural entries of converted results $E(\omega_b)$ and plotted over the different center frequencies ($\omega_b$) is illustrated, and may represent the conversion of the to-be-detected signal from the time domain to the frequency domain.

Figure 6:
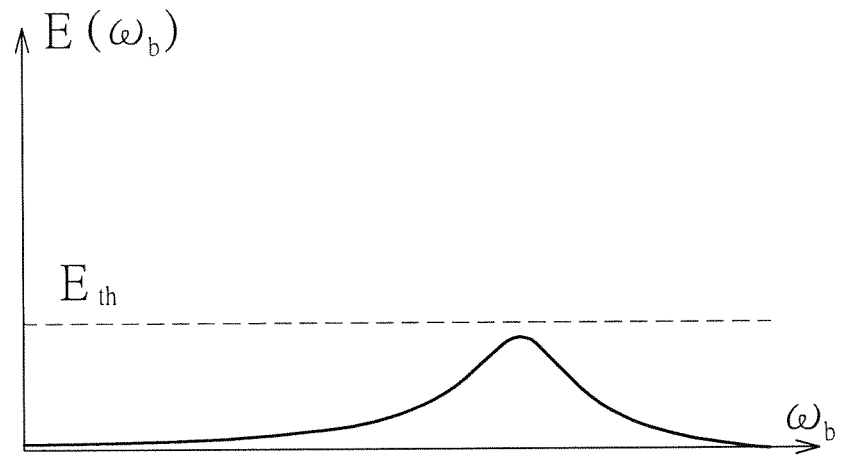
FIG. 6 illustrates that a maximum value of amplitudes of a frequency spectrum is not greater than an amplitude threshold, which suggests that no vibration occurs.
Figure 7:
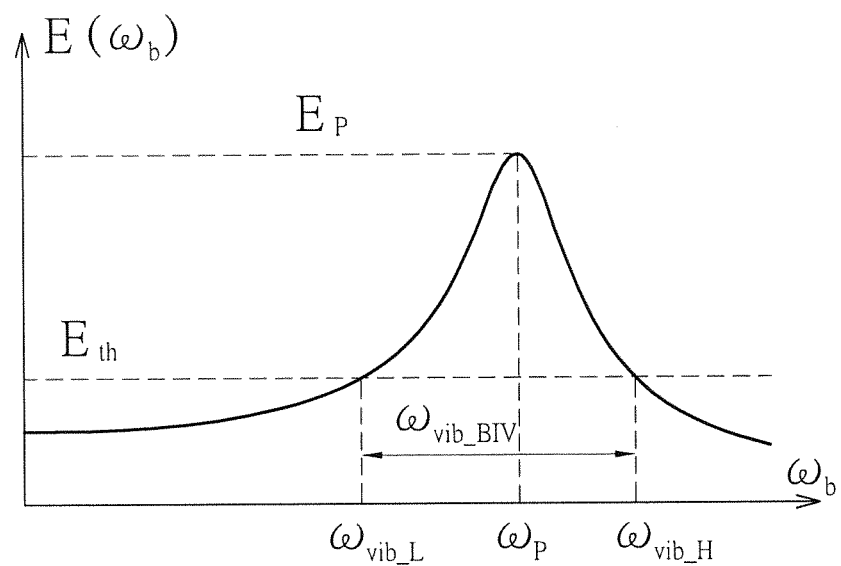
FIG. 7 illustrates that the maximum value of the amplitudes of the frequency spectrum is greater than the amplitude threshold, which suggests that vibration occurs.

Referring to FIG. 5, in step S25 of FIG. 2, the maximum value $E_p$ among the plural entries of converted results $E(\omega_b)$ is determined, i.e., a peak value of the amplitudes of the frequency spectrum 404. The interference frequency $CO_p$ corresponding to the maximum value $E_p$ is also determined. In step S26, the maximum value $E_p$ is compared with the amplitude threshold $E_{th}$. In this embodiment, the amplitude threshold $E_{th}$ is set according to a velocity error limitation of the current motor drive 23. The occurrence of vibration is detected when the maximum value $E_p$ is greater than the amplitude threshold $E_{th}$. Referring to FIG. 6, the maximum value $E_p$ is not greater than the amplitude threshold $E_{th}$, i.e., $E_p \leq E_{th}$, which suggests that no vibration occurs, such that the notch filter 12 refrains from operation in step S27. Referring to FIG. 7, the maximum value $E_p$ is greater than the amplitude threshold $E_{th}$, i.e., $E_p > E_{th}$, and the interference frequency $\omega_p$ corresponding to the maximum value $E_p$ is set as the operating frequency of the notch filter 12 in step S28 so as to mitigate the interference resulting from vibration.

Figure 8:
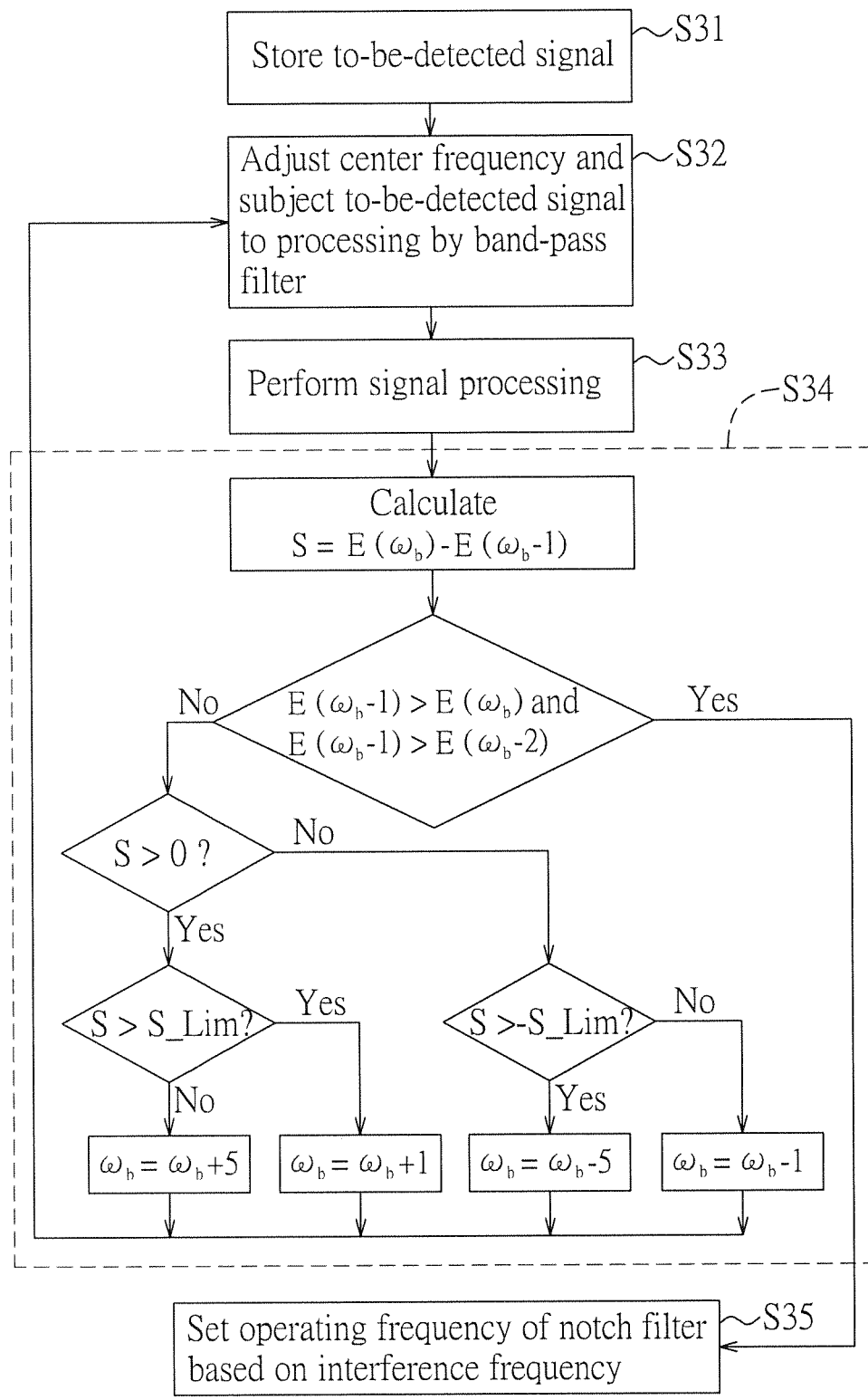
FIG. 8 is a flow chart illustrating a second embodiment of the method for suppression of vibration according to the present invention.
Figure 9:
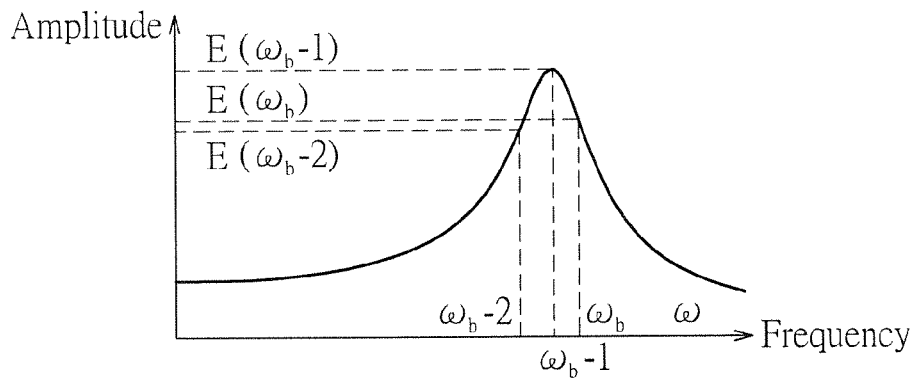
FIG. 9 illustrates a situation that the interference frequency is determined in the second embodiment of the method of the present invention.
Figure 10:
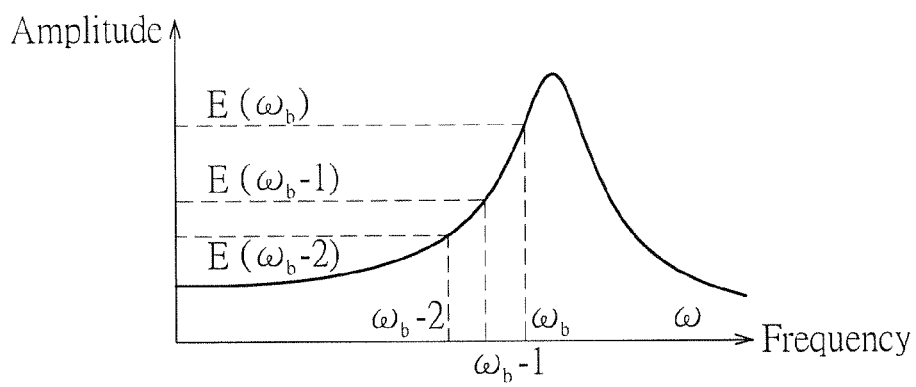
FIG. 10 and FIG. 11 illustrate situations that the interference frequency has not yet been determined in the second embodiment of the method.
Figure 11:
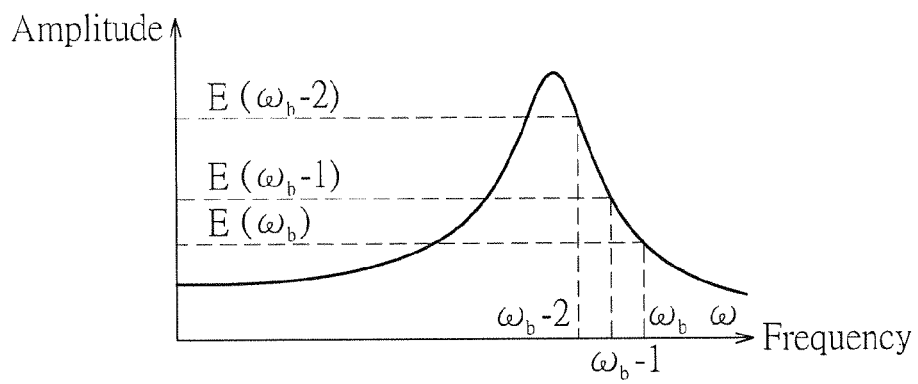

Referring to FIG. 8 in combination with FIG. 9 to FIG. 11, a second embodiment of the method for suppression of vibration according to the present invention is illustrated. The second embodiment of the method is different from the first embodiment in that not all of the frequencies are required to be scanned in the scanning process. Instead, amplitudes of the frequency spectrum corresponding to several frequencies are observed at the same time so as to shorten the scanning process.

In step S31 of the second embodiment, the storage device 3 stores the to-be-detected signal, which is obtained within a time period under the influence of vibration. The to-be-detected signal is temporarily stored in the register unit 101.

In step S32, the processing unit 103 adjusts the center frequency of the band-pass filter 11. In this embodiment, the band-pass filter 11 is set with three different center frequencies with an identical deviation value, e.g., $\omega_b$, $\omega_b-1$, and $\omega_b-2$, sequentially, and the to-be-detected signal is respectively subjected to processing by the band-pass filter 11 set with the three different center frequencies to result in three bandpass-filtered signals, respectively.

In step S33, the calculating unit 102 respectively performs signal processing upon the three bandpass-filtered signals, so as to obtain three converted results, e.g., $E(\omega_b)$, $E(\omega_b-1)$, $E(\omega_b-2)$, corresponding to the three different center frequencies of the band-pass filter 11, respectively, and stores the three converted results. The three converted results may be regarded as amplitudes of a frequency spectrum of the to-be-detected signal over the three different center frequencies.

In step S34, the processing unit 103 calculates a slope S of a line between two of the amplitudes of the frequency spectrum, which are presented by the three converted results over the three different center frequencies, corresponding to any adjacent two of the three different center frequencies of the band-pass filter 11, for example, the slope $S=E(\omega_b)-E(\omega_b-1)$ or the slope $S=E(\omega_b-1)-E(\omega_b-2)$. It is noted that since a difference between the adjacent two of the three different center frequencies is 1 in this embodiment, the slope S may be obtained by directly calculating a difference between two of the three converted results corresponding to said adjacent two of the three different center frequencies. The processing unit 103 subsequently determines whether a condition of $E(\omega_b-1)>E(\omega_b)$ and $E(\omega_b-1)>E(\omega_b-2)$ is satisfied, i.e., to determine whether one of the three converted results that corresponds to a median value of the three different center frequencies is greater than the other two of the three converted results.

In step S35, when the processing unit 103 determines that the condition of $E(\omega_b-1)>E(\omega_b)$ and $E(\omega_b-1)>E(\omega_b-2)$ is satisfied, it means that the maximum value among the converted results is found as best shown in FIG. 9. That is to say, said one of the three converted results that corresponds to the median value of the three different center frequencies serves as the maximum value, and the median value of the three different center frequencies serves as the interference frequency. The processing unit 103 activates the notch filter 12, and sets the interference frequency $\omega_b-1$ corresponding to the maximum value $E(\omega_b-1)$ as the operating frequency of the notch filter 12 so as to suppress the interference resulting from vibration.

Alternatively, in step S34 of FIG. 8, when the processing unit 103 determines that the condition of $E(\omega_b-1)>E(\omega_b)$ and $E(\omega_b-1)>E(\omega_b-2)$ is not satisfied, the processing unit 103 further determines whether the slope S is greater than zero. When the slope S is determined to be not greater than zero, the processing unit 103 subsequently determines whether the slope S is greater than a slope threshold ($-S\_Lim$). Referring to FIG. 11, when the slope S is not greater zero and when the slope S is determined to be greater than the slope threshold ($-S\_Lim$), it means that the three center frequencies still deviate from the interference frequency, so that a relatively large adjustment should be applied thereto, i.e., $\omega_b = \omega_b - 5$.

When the slope S is not greater than zero and when the slope S is determined to be not greater than the slope threshold (−S_Lim), it means that the three center frequencies are close to the interference frequency, so that a relatively small adjustment should be applied thereto, i.e., $\omega_b=\omega_b-1$. On the other hand, when the slope S is determined to be greater than zero, the processing unit 103 subsequently determines whether the slope S is greater than a slope threshold (S_Lim). Referring to FIG. 10, when the slope S is greater than zero and when the slope S is determined to be greater than the slope threshold (S_Lim), a relatively small adjustment value should be applied to the center frequencies, i.e., $\omega_b=\omega_b+1$. When the slope S is greater than zero and when the slope S is determined to be not greater than the slope threshold (S_Lim), a relatively large adjustment value should be applied to the center frequencies, i.e., $\omega_b=\omega_b+5$. Alternatively, the adjustment value may be a fixed value.

Referring to FIG. 10, a situation that the center frequency of the band-pass filter 11 should be increased is illustrated. Referring to FIG. 11, a situation that the center frequency of the band-pass filter 11 should be decreased is illustrated. Accordingly, the center frequency of the band-pass filter 11 is adjusted in step S32, and step S32 to step S34 are repeated until the maximum value and the interference frequency corresponding to the maximum value are found.

Figure 12:
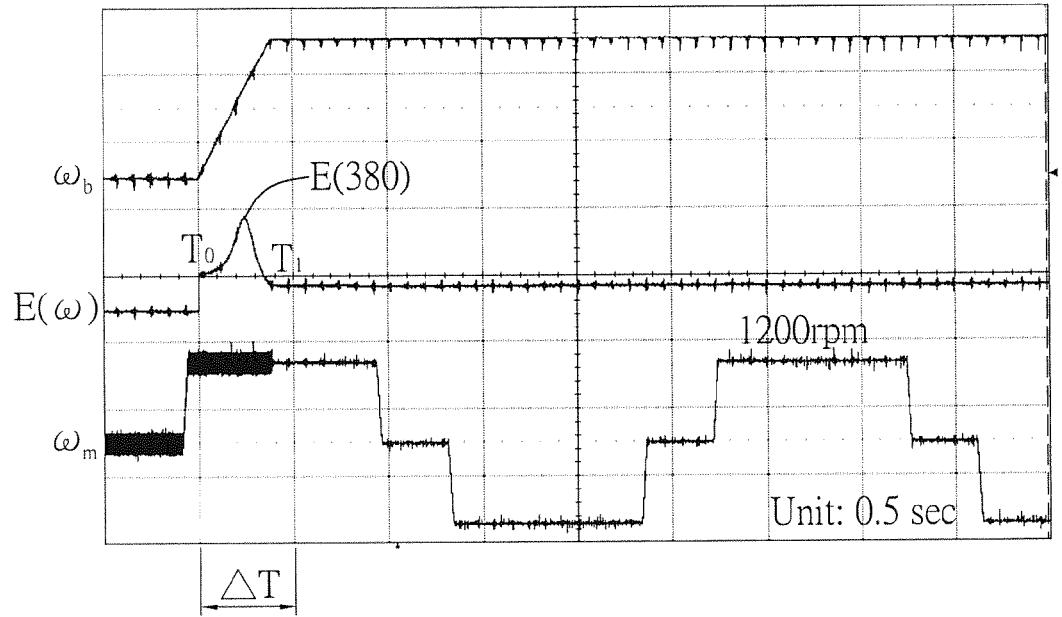
FIG. 12 to FIG. 15 illustrate experimental results of the first embodiment of the method for different rotational speeds of the control system; and FIG. 16 to FIG. 23 illustrates experimental results of the second embodiment of the method for different initial scanning frequencies and for different rotational speeds of the control system.
Figure 13:
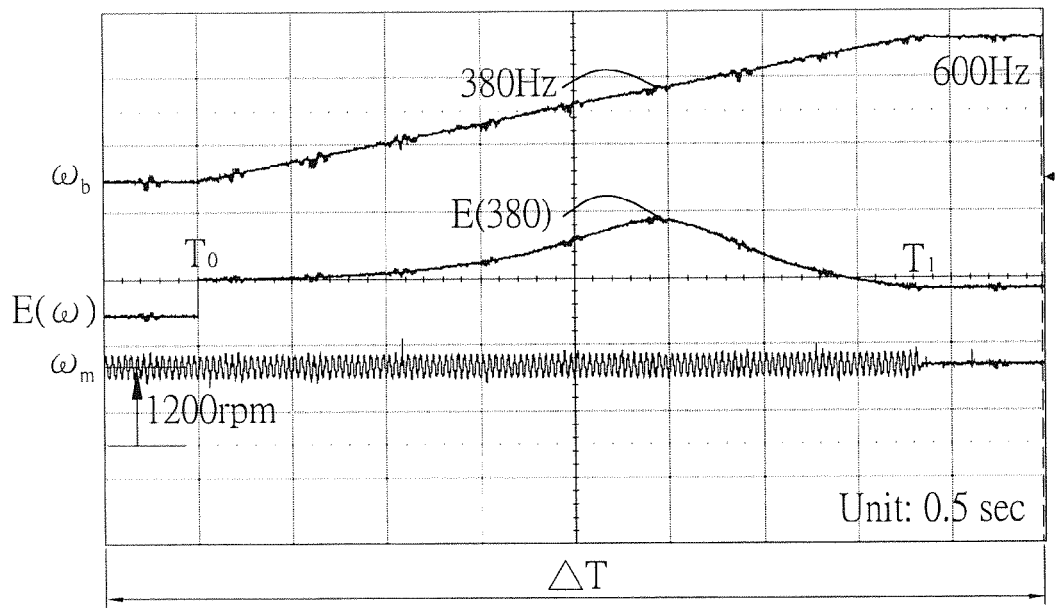

Referring to FIG. 12 and FIG. 13, an experimental result of the first embodiment of the method for suppression of vibration according to the present invention is illustrated. The experiment is conducted using the control system 100, in which a rotational speed ($\omega_m$) of the motor and load 24 is 1200 rpm and the scanning process is performed with the center frequency increased from 10 to 600 Hz. It is evident from of FIG. 13, which is an enlargement of a part of FIG. 12, that the vibration is effectively suppressed within a time period ΔT.

Figure 14:
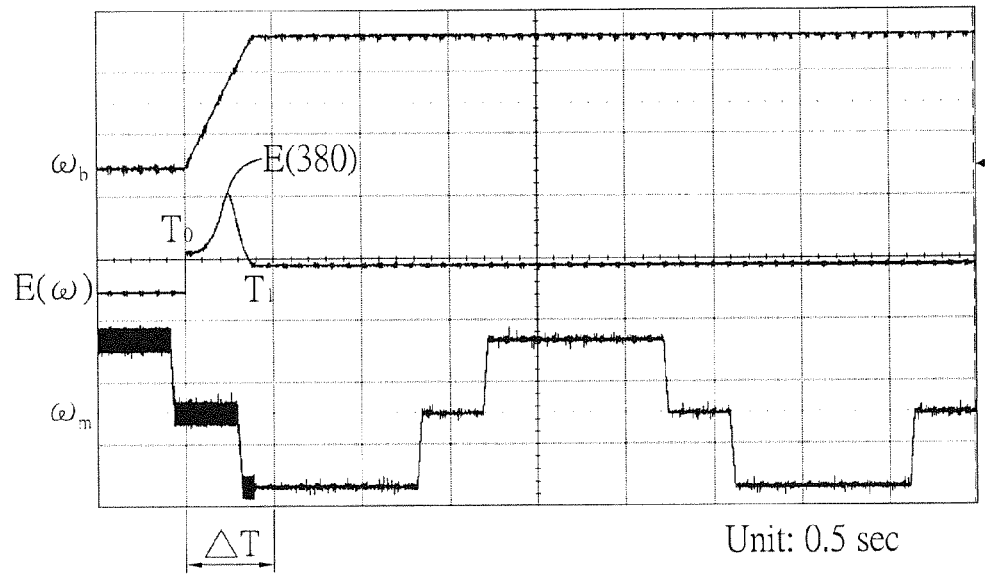
Figure 15:
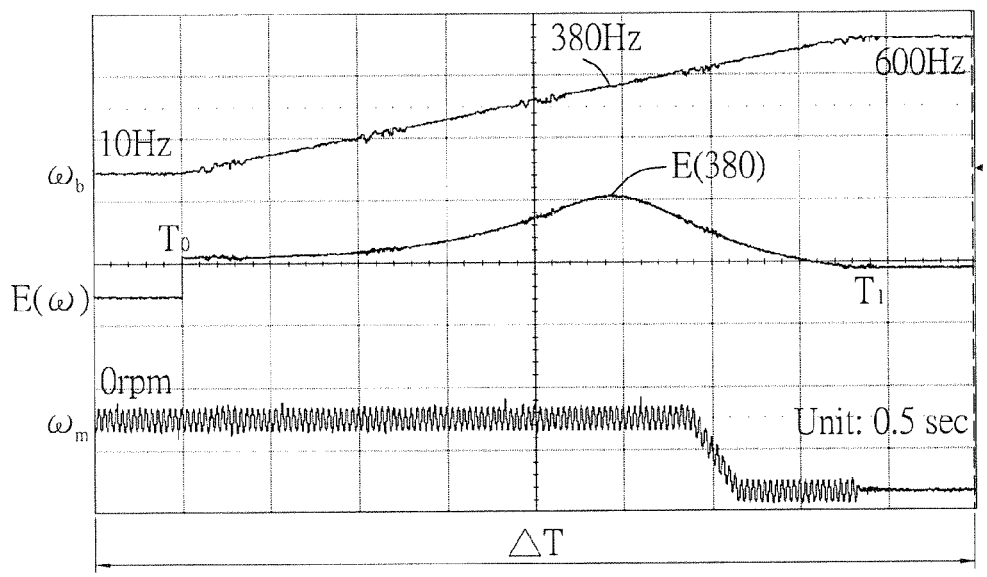

Referring to FIG. 14 and FIG. 15, an experimental result of the first embodiment of the method for suppression of vibration according to the present invention is illustrated. The experiment is conducted using the control system 100, in which the rotational speed ($\omega_m$) of the motor and load 24 is 0 rpm and the scanning process is performed with the center frequency increased from 10 to 600 Hz. It is evident from FIG. 15, which is an enlargement of a part of FIG. 14, that the vibration is effectively suppressed within the time period ΔT.

Figure 16:
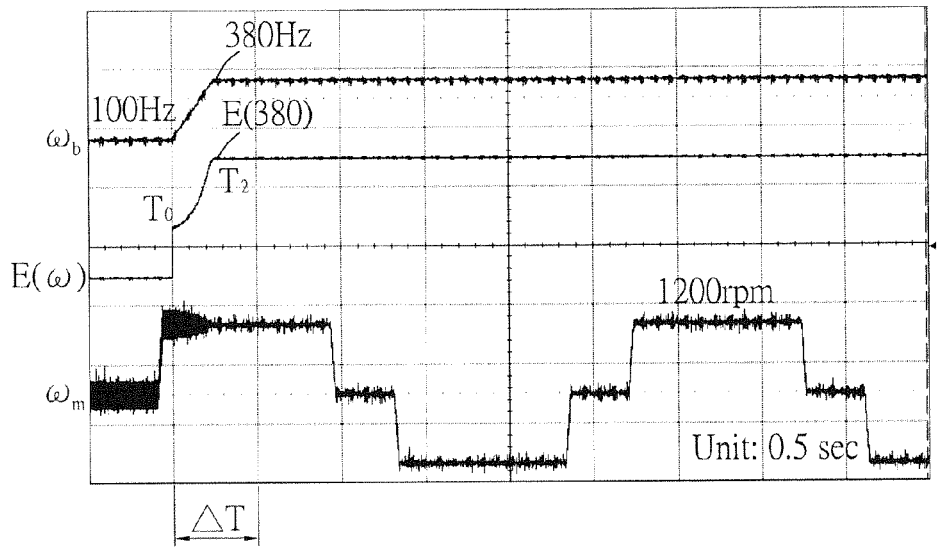
Figure 17:
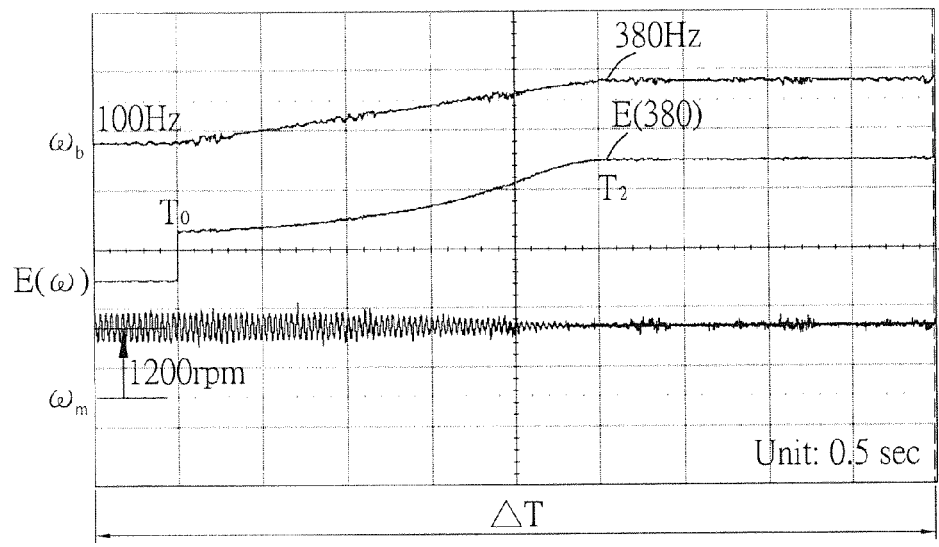

Referring to FIG. 16 and FIG. 17, an experimental result of the second embodiment of the method for suppression of vibration according to the present invention is illustrated. The experiment is conducted using the control system 100, in which the rotational speed ($\omega_m$) of the motor and load 24 is 1200 rpm and the scanning process is performed with an initial center frequency ($\omega_b$) of 100 Hz. It is evident from FIG. 17, which is an enlargement of a part of FIG. 16, that the vibration is effectively suppressed within the time period ΔT.

Figure 18:
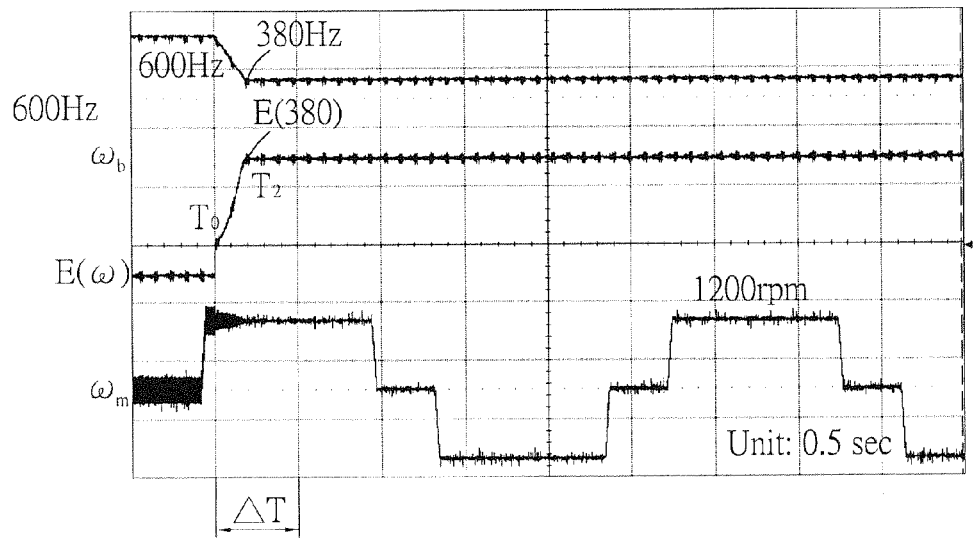
Figure 19:
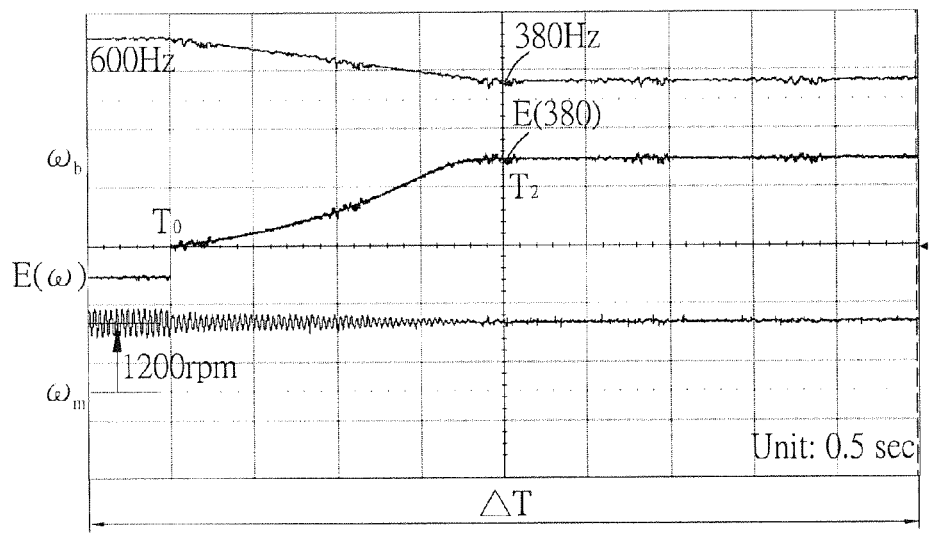

Referring to FIG. 18 and FIG. 19, an experimental result of the second embodiment of the method for suppression of vibration according to the present invention is illustrated. The experiment is conducted using the control system 100, in which the rotational speed ($\omega_m$) of the motor and load 24 is 1200 rpm and the scanning process is performed with an initial center frequency ($\omega_b$) of 600 Hz. It is evident from FIG. 19, which is an enlargement of a part of FIG. 18, that the vibration is effectively suppressed within the time period ΔT.

Figure 20:
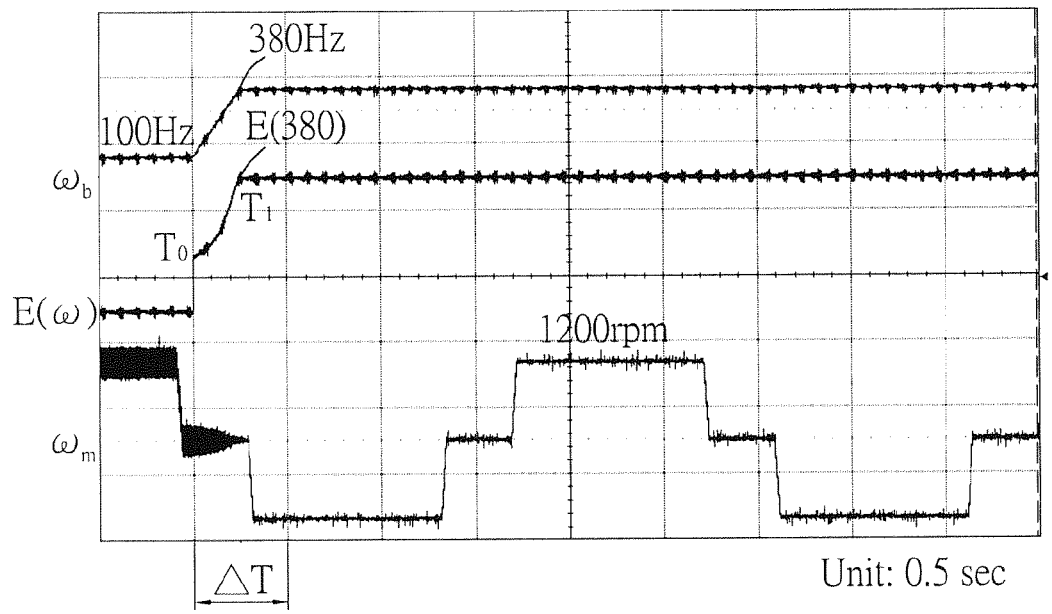
Figure 21:
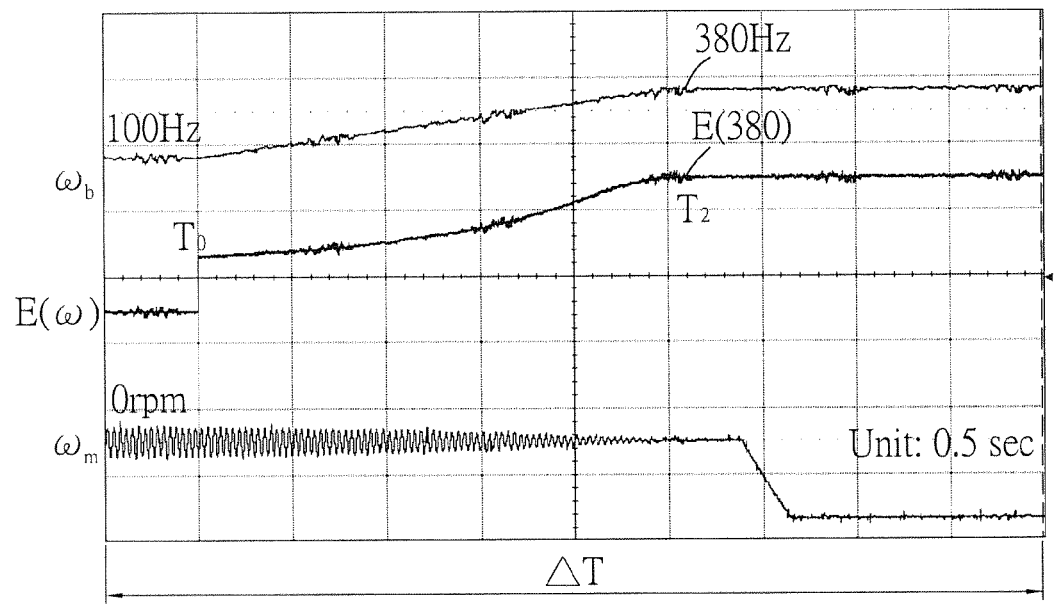

Referring to FIG. 20 and FIG. 21, an experimental result of the second embodiment of the method for suppression of vibration according to the present invention is illustrated. The experiment is conducted using the control system 100, in which the rotational speed ($\omega_m$) of the motor and load 24 is 0 rpm and the scanning process is performed with an initial center frequency ($\omega_b$) of 100 Hz. It is evident from FIG. 21, which is an enlargement of a part of FIG. 20, that the vibration is effectively suppressed within the time period ΔT.

Figure 22:
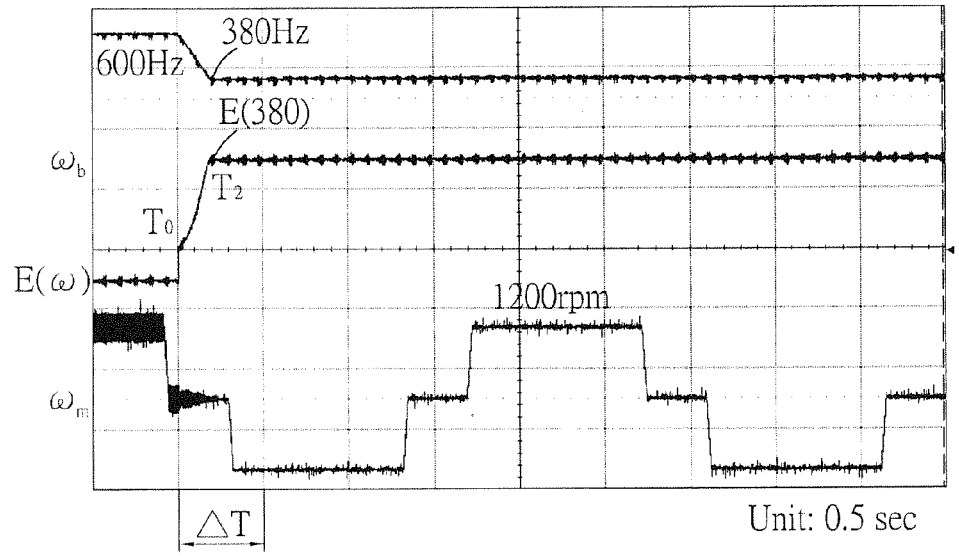
Figure 23:
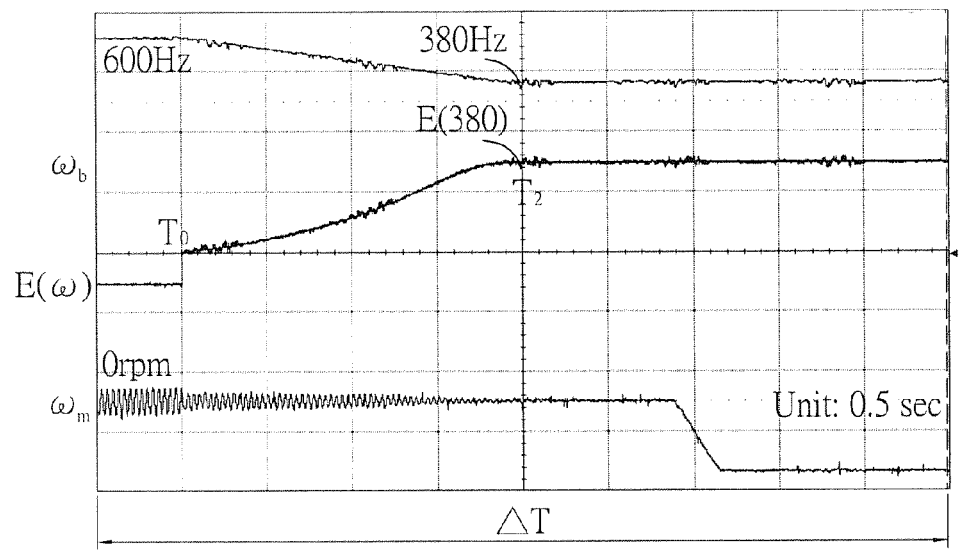

Referring to FIG. 22 and FIG. 23, an experimental result of the second embodiment of the method for suppression of vibration according to the present invention is illustrated. The experiment is conducted using the control system 100, in which the rotational speed ($\omega_m$) of the motor and load 24 is 0 rpm and the scanning process is performed with an initial center frequency ($\omega_b$) of 600 Hz. It is evident from FIG. 23, which is an enlargement of a part of FIG. 22, that the vibration is effectively suppressed within the time period ΔT.

To sum up, the center frequency of the band-pass filter may be adjusted, and the to-be-detected signal is subjected to processing by the band-pass filter to result in the bandpass-filtered signal. The bandpass-filtered subsequently undergoes the signal processing (e.g., absolute value and cumulative average) to result in the converted result. The aforementioned steps are repeated until the scanning process is completed so as to obtain the frequency spectrum represented by the converted results over the center frequencies. The maximum value among the converted results is determined, and one of the center frequencies corresponding to the maximum value is determined to serve as the interference frequency, such that an effect of automatic detection may be achieved. Moreover, another type of the scanning process is introduced so as to reduce time consumption. In this way, the operating frequency of the notch filter may be adjusted according to the interference frequency so as to achieve an effect of vibration suppression.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for suppression of vibration that occurs in a control system, the method to be implemented by the control system and comprising the steps of:
   (A) receiving a to-be-detected signal obtained within a time period under the influence of vibration;
   (B) adjusting a center frequency of a band-pass filter, and subjecting the to-be-detected signal to processing by the band-pass filter to result in a bandpass-filtered signal;
   (C) performing signal processing upon the bandpass-filtered signal to obtain a converted result corresponding to a current center frequency of the band-pass filter;
   (D) determining whether a scanning process is completed, and when the scanning process is determined to be not completed, repeating steps (B) and (C) to result in plural entries of the converted results;
   (E) when the scanning process is determined to be completed in step (D), determining a maximum value among the plural entries of the converted results, and determining the corresponding center frequency to serve as an interference frequency associated with the vibration that occurs in the control system; and
   (F) setting the interference frequency as an operating frequency of a notch filter of the control system so as to suppress the vibration.

2. The method according to claim 1, wherein, in step (C), the signal processing includes:

taking an absolute value of the bandpass-filtered signal, and calculating a cumulative average of the absolute value of the bandpass-filtered signal to obtain the converted result; and storing the converted result together with the current center frequency of the band-pass filter.

3. The method according to claim 1, wherein step (D) includes the sub-steps of:

determining whether the current center frequency of the band-pass filter adjusted in step (B) reaches a predetermined range; and updating the current center frequency by an increment when the current center frequency of the band-pass filter is determined as not yet reaching the predetermined range, and going back to step (B);

wherein the flow proceeds to step (E) when the current center frequency of the band-pass filter is determined to reach the predetermined range.

4. The method according to claim 1, further comprising, between steps (E) and (F), the step of:

determining whether the maximum value is greater than an amplitude threshold;

wherein the flow proceeds to step (F) when the maximum value is determined to be greater than the amplitude threshold; and wherein the notch filter is controlled to refrain from operation when the maximum value is determined to be not greater than the amplitude threshold.

5. The method according to claim 1, wherein, in step (B), the band-pass filter is set with three different center frequencies, and the to-be-detected signal is respectively subjected to processing by the band-pass filter set with the three different center frequencies to result in three bandpass-filtered signals, respectively.

6. The method according to claim 5, wherein, in step (C), the signal processing is performed upon the three bandpass-filtered signals, so as to obtain three converted results corresponding to the three different center frequencies of the band-pass filter, respectively.

7. The method according to claim 6, wherein step (D) includes:

determining whether one of the three converted results that corresponds to a median value of the three different center frequencies is greater than the other two of the three converted results, proceeding to step (E) when a result of the determination is affirmative, and going back to step (B) when otherwise;

wherein, in step (E), said one of the three converted results that corresponds to the median value of the three different center frequencies serves as the maximum value, and the median value of the three different center frequencies serves as the interference frequency.

8. The method according to claim 7, wherein step (D) further includes:

calculating a slope of a line between two of amplitudes of a frequency spectrum, which are presented by the three converted results over the three different center frequencies, corresponding to any adjacent two of the three different center frequencies of the band-pass filter; and updating the current three different center frequencies according to the slope thus calculated.

9. The method according to claim 8, wherein, in step (D), the current three different center frequencies are updated by an adjustment value, the adjustment value being one of a fixed value and a variable value that is determined according to the slope thus calculated.

10. A control system configured for suppression of vibration that occurs therein, said control system comprising a band-pass filter, a notch filter, and a controller coupled to said band-pass filter and said notch filter;

wherein said controller is configured to receive a to-be-detected signal obtained within a time period under the influence of vibration, adjust a center frequency of said band-pass filter, and subject the to-be-detected signal to processing by said band-pass filter to result in a bandpass-filtered signal, perform signal processing upon the bandpass-filtered signal to obtain a converted result corresponding to a current center frequency of said band-pass filter, determine whether a scanning process is completed, and when the scanning process is determined to be not completed, repeat adjusting of the center frequency and performing of the signal processing to result in plural entries of the converted results, when the scanning process is determined to be completed, determine a maximum value among the plural entries of the converted results, and determine the corresponding center frequency to serve as an interference frequency associated with the vibration that occurs in said control system, and set the interference frequency as an operating frequency of said notch filter so as to suppress the vibration.

11. The control system according to claim 10, wherein, the signal processing includes:

taking an absolute value of the bandpass-filtered signal, and calculating a cumulative average of the absolute value of the bandpass-filtered signal to obtain the converted result; and storing the converted result together with the current center frequency of said band-pass filter.

12. The control system according to claim 10, wherein the determination as to whether the scanning process is completed includes:

determining whether the current center frequency of said band-pass filter reaches a predetermined range; and updating the current center frequency by an increment when the current center frequency of said band-pass filter is determined as not yet reaching the predetermined range.

13. The control system according to claim 10, wherein said controller is further configured to:

determine whether the maximum value is greater than an amplitude threshold;

wherein said notch filter is controlled to refrain from operation when the maximum value is determined to be not greater than the amplitude threshold.

14. The control system according to claim 10, wherein said band-pass filter is set with three different center frequencies, and the to-be-detected signal is respectively subjected to processing by said band-pass filter set with the three different center frequencies to result in three bandpass-filtered signals, respectively.

15. The control system according to claim 14, wherein, the signal processing is performed upon the three bandpass-filtered signals, so as to obtain three converted results corresponding to the three different center frequencies of said band-pass filter, respectively.

16. The control system according to claim 15, wherein said controller is further configured to determine whether one of the three converted results that corresponds to a median value of the three different center frequencies is greater than the other two of the three converted results;

wherein said one of the three converted results that corresponds to the median value of the three different center frequencies serves as the maximum value, and the median value of the three different center frequencies serves as the interference frequency.

17. The control system according to claim 16, wherein said controller is further configured to:
calculate a slope of a line between two of amplitudes of a frequency spectrum, which are presented by the three converted results over the three different center frequencies, corresponding to any adjacent two of the three different center frequencies of said band-pass filter; and
update the current three different center frequencies according to the slope thus calculated.

18. The control system according to claim 17, wherein the current three different center frequencies are updated by an adjustment value, the adjustment value being one of a fixed value and a variable value that is determined according to the slope thus calculated.

* * * * *